(12) United States Patent
Tang et al.

(10) Patent No.: US 8,068,234 B2
(45) Date of Patent: Nov. 29, 2011

(54) METHOD AND APPARATUS FOR MEASURING SHAPE OR THICKNESS INFORMATION OF A SUBSTRATE

(75) Inventors: Shouhong Tang, Tucson, AZ (US);
George Kren, Los Altos Hills, CA (US);
Dieter Mueller, Cupertino, CA (US);
Brian Haas, San Jose, CA (US); Daniel Kavaldjiev, San Jose, CA (US)

(73) Assignee: KLA-Tencor Corporation, San Jose, CA (US)

( * ) Notice: Subject to any disclaimer, the term of this patent is extended or adjusted under 35 U.S.C. 154(b) by 326 days.

(21) Appl. No.: 12/388,487

(22) Filed: Feb. 18, 2009

(65) Prior Publication Data

US 2010/0208272 A1    Aug. 19, 2010

(51) Int. Cl.
*G01B 11/02* (2006.01)
(52) U.S. Cl. ....................................... 356/503; 356/511
(58) Field of Classification Search .................. 356/503, 356/512, 511, 505
See application file for complete search history.

(56) References Cited

U.S. PATENT DOCUMENTS

| | | | |
|---|---|---|---|
| 6,504,615 B1 | 1/2003 | Abe et al. | |
| 6,764,380 B2 | 7/2004 | Wiswesser et al. | |
| 6,847,458 B2 | 1/2005 | Freischlad et al. | 356/503 |
| 7,009,696 B2 | 3/2006 | Sullivan et al. | 356/237.4 |
| 7,057,741 B1 | 6/2006 | Mueller et al. | 356/512 |
| 7,340,962 B2* | 3/2008 | Ueki | 73/856 |
| 2004/0184038 A1 | 9/2004 | Freischlad et al. | |
| 2007/0229842 A1 | 10/2007 | Jansen | |

OTHER PUBLICATIONS

SPIE, Advanced Characterization Techniques for Optics, Semiconductors, and Nanotechnologies III, No. 6672-1, San Diego, USA, Aug. 2007.
The International Search Report and The Written Opinion of the International Searching Authority dated Sep. 17, 2010 issued for the International patent application No. PCT/US2010/024305.

* cited by examiner

*Primary Examiner* — Tarifur Chowdhury
*Assistant Examiner* — Jonathan Hansen
(74) *Attorney, Agent, or Firm* — Joshua D. Isenberg; JDI Patent

(57) ABSTRACT

An interferometer system and method may be used to measure substrate thickness or shape. The system may include two spaced apart reference flats having that form an optical cavity between two parallel reference surfaces. A substrate holder may be configured to place the substrate in the cavity with first and second substrate surfaces substantially parallel with corresponding first and second reference surfaces such that a space between the first or second substrate surface is three millimeters or less from a corresponding one of the reference surfaces or a damping surface. Interferometer devices may be located on diametrically opposite sides of the cavity and optically coupled thereto. The interferometers can map variations in spacing between the substrate surfaces and the reference surfaces, respectively, through interference of light optically coupled to and from to the cavity via the interferometer devices.

58 Claims, 6 Drawing Sheets

METHOD AND APPARATUS FOR MEASURING SHAPE OR THICKNESS INFORMATION OF A SUBSTRATE

FIELD OF THE INVENTION

This invention generally relates to semiconductor fabrication and more particularly to the use of interferometry in measuring the shape and thickness variation of a semiconductor substrate.

BACKGROUND OF THE INVENTION

Interferometry is an optical technique for measuring a phase shift due to variations in optical path. Typically a probe beam is split into to parts that are sent through two different paths, one part, called the probe beam travels through a path that includes a sample of interest. The other part, sometimes called a reference beam travels through a path that does not include the sample. The two beams are recombined after the probe beam has interacted with the sample and the reference beam has not. Interference of the two beams due to different optical path lengths can be detected with a photosensitive detector.

Interferometry has many applications for measurement of relatively small changes in distance, e.g., distance changes of the order of the wavelength of light used by the interferometer. Interferometry may be implemented by reflecting the probe beam off the sample. Such reflection may be done at normal incidence or at grazing incidence. Normal incidence interferometry requires a high reflectance surface. This may be impractical for certain types of samples. Grazing incidence interferometry, by contrast, can be done on a very rough surface, e.g., as rough as a business card. Grazing incidence interferometry may therefore be utilized with a greater variety of samples than normal incidence interferometry.

One example of normal incidence interferometry for measurement of the surface height and thickness variation on both sides of a wafer rapidly and accurately is described in U.S. Pat. No. 6,847,458 B2, January 2005, and also in SPIE, Advanced Characterization Techniques for Optics, Semiconductors, and Nanotechnologies III, No. 6672-1, San Diego, USA, August 2007, both of which are incorporated herein by reference in their entirety. The technique described therein combines two phase-shifting Fizeau interferometers to simultaneously obtain two single-sided distance map between each side of a wafer and corresponding reference flats, and compute thickness variation and shape of the wafer from these data and calibrated distance map between two reference flats. This technique does not place the reference plate(s) very close to the wafer so that the system is sensitive to wafer vibration and does not allow the use of light sources with short temporal coherence length.

Unfortunately, grazing incidence interferometry requires a long beam path. Light sources used in grazing incidence interferometry typically have a coherence length of a few millimeters, e.g., about three millimeters. Consequently, grazing incidence interferometry is sensitive to vibration and thermal variation in the beam path. Thermal variation can be addressed by various temperature stabilizing techniques. Vibration is particularly difficult to address at low frequencies, e.g., 100 Hz or less. In addition, the apparatus described in U.S. Pat. No. 6,847,458 requires optical components such as reference flats and collimators to be larger than the wafer in diameter. As a result of this requirement, the system is expensive, particularly for large diameter wafers (e.g., 450 millimeter diameter wafers).

Another interferometry technique described in U.S. Pat. No. 7,009,696 B2, Mar. 7, 2006, and U.S. Pat. No. 7,057,741 B2, Mar. 7, 2006, both of which are incorporated herein by reference in their entirety, is able to measure the surface height on both sides and thickness variation of a wafer. This technique combines two grazing incidence interferometers, simultaneously obtaining front- and backside topography data, and computes thickness variation and shape of the wafer from these data. Multiple measurements of portions of the wafer are stitched together to obtain full wafer topography data maps. A flat bar in close proximity to portions of one side of the wafer provides a damping arrangement reducing unwanted wafer vibrations during measurement.

Unfortunately, this technique has a long, non-common optical path length between the object being measured and the reference which makes it susceptible to air temperature gradients (and resulting air turbulence). The damping arrangement does not cover the entire surface area of the wafer and is applied only on one side of the wafer. Consequently, the damping is generally regarded as less effective. Furthermore, this technique uses a grazing incidence optical arrangement, which results in relatively low accuracy and precision measurements. In addition, system to system matching is difficult with such an optical arrangement.

It is within this context that embodiments of the present invention arise.

SUMMARY OF THE INVENTION

The disadvantages associated with prior art may be overcome by embodiments of the invention. According to a first embodiment, an improved interferometer apparatus may be used for measuring thickness of a substrate. Such an apparatus may include in combination first and second spaced apart reference flats having corresponding first and second parallel reference surfaces forming an optical cavity there between for placement of the substrate. A substrate holder may be configured to place the substrate in the cavity between the reference flats such that first and second surfaces of the substrate are substantially parallel with corresponding first and second reference surfaces of the first and second reference flats and such that the first or second surface of the substrate is less than or equal to 3 millimeters or 2.5 millimeters, preferably less than or equal to two millimeters, more preferably less than or equal to 1.5 millimeters and still more preferably less than or equal to one millimeter from a corresponding one of the first or second reference flat. For all of these spacings it may be desirable for the first or second surface of the substrate to be greater than or equal to 0.5 millimeters from a corresponding one of the first or second reference flat. The distances to the first and the second reference flat may or may be not equivalent.

First and second interferometer devices may be located on diametrically opposite sides of the cavity and optically coupled thereto. The first and second interferometers are respectively operable to map variations in spacing between the first and second surfaces of the substrate and the first and second reference surfaces, respectively, through interference of light optically coupled to and from to the cavity via the first and second interferometer devices.

In some versions of the first embodiment, the system may further comprise first and second interferogram detectors and at least one computer coupled to receive the outputs of the first and second interferogram detectors for determining thickness variations of the substrate.

In some versions of the first embodiment, the first and second reference flats may have dimensions such that an oversized field of view is provided for the substrate.

In some versions of the first embodiment, the first and second interferometer devices may be Fizeau interferometers.

In some versions of the first embodiment, one or more light sources optically coupled to the first and second interferometer devices. These light sources may include a source of light configured to produce light of multiple wavelengths. In some versions, the light sources may include one or more sources of short coherence light. In some versions, the light sources may include an illuminator and first and second optical fibers coupled between the illuminator and the first and second interferometer devices respectively.

In some versions of the first embodiment, the substrate holder may include an open ended frame adapted to receive the substrate and two or more edge holders attached to the frame and adapted to hold the substrate by an edge thereof. The edge holders may be sized to fit within a gap between the first and second reference surfaces of the reference flats.

In some versions of the first embodiment, the first and second reference flats may be of a size smaller than the substrate, so that a portion of the first or second surface of the substrate does not overlap the first or second reference surface. In such a case the apparatus may further comprise at least one damping plate and a positioning mechanism coupled to the damping plate. The damping plate is located proximate the portion of the first or second surface of the substrate that does not overlap the first or second reference surface. The damping plate has a damping surface configured to be oriented substantially parallel to the first or second surface of the substrate when the substrate holder places the substrate in the cavity. The positioning mechanism may be operable to position the damping plate such that the damping surface is two millimeters or less from the first or second surface of the substrate.

In some implementations of this version of the first embodiment, the positioning mechanism may be operable to move the damping plate perpendicular to the first or second surface of the substrate by a distance sufficient to allow the substrate holder to place the substrate between the first and second reference surfaces.

In some implementations of this version the at least one damping plate may comprises first and second damping plates. The first damping plate overlaps a portion of the first surface of the substrate that does not overlap the first reference surface. The first damping plate has a first damping surface oriented parallel to the first reference surface. The second damping plate overlaps a portion of the second surface of the substrate that does not overlap the second reference surface. The second damping plate has a second damping surface oriented parallel to the second reference surface.

In such an implementation, the positioning mechanism may include first and second actuators respectively coupled to the first and second damping plates. The first actuator may be operable to position the first damping plate such that the first damping surface is 3 millimeters or less from the first surface of the substrate. The second actuator may be operable to position the second damping plate such that the second damping surface is 3 millimeters or less from the second surface of the substrate.

In some implementations of this version at least one damping plate, the substrate holder and the first and second reference flats may be oriented such that a center of the reference flats is off-center with respect to a center of the at least one damping plate and a center of the substrate when the substrate is placed in the optical cavity.

In some implementations of this version an edge of the substrate may be located proximate an edge of the first and second reference flats when the substrate is placed in the optical cavity.

In some implementations of this version the first and second reference flats may have a diameter that is sufficiently large that the first and second reference flats overlap a portion of the substrate that includes an edge and a center of the substrate when the substrate is placed in the optical cavity.

In some implementations of this version the substrate holder may be configured to rotate or translate the substrate while the substrate is placed in the optical cavity According to a second embodiment, a method for measuring shape or thickness information of a substrate is presented. In this method a substrate is placed in a cavity formed between first and second reference flats in first and second interferometer channels to map at least a portion of first and second test surfaces of the substrate. The substrate is placed such that first and second test surfaces of the substrate are substantially parallel with corresponding first and second reference surfaces of the first and second reference flats and such that the first or second test surface is within less than or equal to 3 millimeters or 2.5 millimeters, preferably less than or equal to two millimeters, more preferably less than or equal to 1.5 millimeters and still more preferably less than or equal to one millimeter from a corresponding one of the first or second reference surfaces. For all of these spacings it may be desirable for the first or second surface of the substrate to be greater than or equal to 0.5 millimeters from a corresponding one of the first or second reference flat.

The cavity characteristics of the reference surfaces forming the cavity are measured using the first or second interferometer channels. A first phase shift is provided in the interferometer channels to map at least a portion of the first and second test surfaces of the substrate and a second phase shift is provided for measuring the cavity characteristics of the reference surfaces. The shape or thickness information is determined from interferometer maps of the first and second test surfaces and the cavity characteristics.

In some versions of the second embodiment the first or second phase shift may be provided by varying a relative distance between the one of the reference surfaces and a corresponding one of the test surfaces.

In some versions of the second embodiment the shape or thickness information includes a thickness variation of the substrate.

In some versions of the second embodiment providing the first or second phase shift may include varying a wavelength of light used in the first or second interferometer channels. In such versions, the shape or thickness information may include an absolute thickness of the substrate.

In some versions of the second embodiment, the first and second reference flats may be of a size smaller than the substrate, whereby a portion of the first or second surface of the substrate does not overlap the first or second reference surface. In such versions the method may further comprise positioning at least one damping plate proximate the portion of the first or second surface of the substrate that does not overlap the first or second reference surface. The at least one damping plate may have a damping surface oriented parallel to the first or second reference surface. The damping plate may be positioned such that the damping surface is 3 millimeters or less from the first or second surface of the substrate.

In some implementations of such versions of the second embodiment, before the substrate is placed in the cavity formed between the first and second reference surfaces, the damping plate may be moved perpendicular to the first or second surface of the substrate by a distance sufficient to allow the substrate holder to place the substrate between the first and second reference surfaces.

In some implementations of such versions of the second embodiment the at least one damping plate may comprise a first damping plate and a second damping plate. The first damping plate may overlap a portion of the first surface of the substrate that does not overlap the first reference surface. The first damping plate may have a first damping surface oriented parallel to the first reference surface. In addition, the second damping plate may overlap a portion of the second surface of the substrate that does not overlap the second reference surface. The second damping plate may also have a second damping surface oriented parallel to the second reference surface.

In such implementations the first damping plate may be positioned such that the first damping surface is 3 millimeters or less from the first surface of the substrate. Similarly, the second damping plate may be positioned such that the second damping surface is one millimeter or less from the second surface of the substrate.

In some implementations of this version a center of the reference flats may be off-center with respect to a center of the at least one damping plate and a center of the substrate when the substrate is placed in the optical cavity.

In some implementations of this version an edge of the substrate may be located proximate an edge of the first and second reference flats when the substrate is placed in the optical cavity.

In some implementations of this version the first and second reference flats may have a diameter that is sufficiently large that the first and second reference flats overlap a portion of the substrate that includes an edge and a center of the substrate when the substrate is placed in the optical cavity.

Some implementations of this version may further comprise rotating or translating the substrate and interferometrically mapping a different portion the first and second test surfaces when the substrate is in the optical cavity.

According to a third embodiment, an interferometer system may comprise first and second spaced apart reference flats having corresponding first and second parallel reference surfaces forming an optical cavity sized to receive a substrate therebetween. The first and second reference flats may be of a size smaller than the substrate so that a portion of the first or second surface of the substrate does not overlap the first or second reference surface. At least one damping plate is located proximate the portion of the first or second surface of the substrate that does not overlap the first or second reference surface. the at least one damping plate having a damping surface configured to be oriented parallel to the first or second surface of the substrate when the substrate is placed in the cavity. A positioning mechanism is coupled to the damping plate. The positioning mechanism is operable to position the damping plate such that the damping surface is 3 millimeters or less from the first or second surface of the substrate. First and second interferometer devices are located on diametrically opposite sides of the cavity and optically coupled thereto. The first and second interferometers are respectively operable to map variations in spacing between the first and second surfaces of the substrate and the first and second reference surfaces, respectively through interference of light optically coupled to and from to the cavity via the first and second interferometer devices.

The system may further include a substrate holder configured to place the substrate in the cavity between the reference flats such that first and second surfaces of the substrate are substantially parallel with corresponding first and second reference surfaces of the first and second reference flats. The positioning mechanism may be operable to move the damping plate perpendicular to the first or second surface of the substrate by a distance sufficient to allow the substrate holder to place the substrate between the first and second reference surfaces.

In some implementations of the system, the at least one damping plate may comprises a first damping plate and a second damping plate. The first damping plate overlaps a portion of the first surface of the substrate that does not overlap the first reference surface, the first damping plate having a first damping surface oriented parallel to the first reference surface. The second damping plate overlaps a portion of the second surface of the substrate that does not overlap the second reference surface. The second damping plate has a second damping surface oriented parallel to the second reference surface. In such an implementation the positioning mechanism may optionally include a first actuator coupled to the first damping plate and a second actuator coupled to the second damping plate. wherein the first actuator is operable to position the first damping plate such that the first damping surface is two millimeters or less from the first surface of the substrate, wherein the second actuator is operable to position the second damping plate such that the second damping surface is two millimeters or less from the second surface of the substrate.

In some implementations of the system the at least one damping plate and the first and second reference flats may be oriented such that a center of the reference flats is off-center with respect to a center of the at least one damping plate and a center of the substrate when the substrate is placed in the optical cavity. In such implementations, an edge of the substrate may be located proximate an edge of the first and second reference flats when the substrate is placed in the optical cavity. Alternatively, the first and second reference flats may have a diameter that is sufficiently large that the first and second reference flats overlap a portion of the substrate that includes an edge and a center of the substrate when the substrate is placed in the optical cavity.

In other implementations, the system may further include a substrate holder configured to move the substrate in a plane parallel to a plane of the at least one damping plate while the substrate is placed in the optical cavity. In such implementations, the substrate holder may be configured to translate the substrate in one or more directions parallel to the plane of the at least one damping plate. Alternatively, the substrate holder may be configured to rotate the substrate about an axis perpendicular to the plane parallel to a plane of the at least one damping plate.

According to a fourth embodiment an alternative method for measuring shape or thickness information of a substrate is presented. In this method a first portion of a substrate is placed in an optical cavity formed between first and second reference flats in first and second interferometer channels to map first and second test surfaces of the substrate. First and second surfaces of the substrate are substantially parallel with corresponding first and second reference surfaces of the first and second reference flats. The first and second reference flats are of a size smaller than the substrate, so that a portion of the first or second surface of the substrate does not overlap the first or second reference surface. At least one damping plate is positioned proximate the portion of the first or second surface of the substrate that does not overlap the first or second reference surface. The at least one damping plate has a damping surface oriented parallel to the first or second reference surface. The damping plate is positioned such that the damping surface is two millimeters or less from the first or second surface of the substrate.

Cavity characteristics of the reference surfaces forming the cavity are measured using the first or second interferometer channels. A first phase shift is provided in the interferometer channels to produce a first interferometer map of first portions of the first and second test surfaces of the substrate. A second phase shift is provided for measuring the cavity characteristics of the reference surfaces. The substrate is moved to place a second portion of the substrate in the optical cavity. The first and second phase shifts may be repeated to produce a second interferometer map of second portions of the first and second test surfaces of the substrate. The first and second interferometer maps may be stitched together and the shape or thickness information of the substrate may be determined from the first and second interferometer maps and the cavity characteristics.

In some versions of the fourth embodiment, the at least one damping plate may comprise a first damping plate and a second damping plate. The first damping plate may overlap a portion of the first surface of the substrate that does not overlap the first reference surface, the first damping plate may have a first damping surface oriented parallel to the first reference surface. The second damping plate may overlap a portion of the second surface of the substrate that does not overlap the second reference surface, the second damping plate having a second damping surface oriented parallel to the second reference surface.

In such versions, positioning the least one damping plate may include positioning the first damping plate such that the first damping surface is 3 millimeters or less from the first surface of the substrate. Positioning the least one damping plate may further include positioning the second damping plate such that the second damping surface is 3 millimeters or less from the second surface of the substrate. In some implementations of such versions, a center of the reference flats may be off-center with respect to a center of the at least one damping plate and a center of the substrate when the substrate is placed in the optical cavity. Alternatively, an edge of the substrate may be located proximate an edge of the first and second reference flats when the substrate is placed in the optical cavity.

In some versions of the fourth embodiment, the first and second reference flats may have a diameter that is sufficiently large that the first and second reference flats overlap a portion of the substrate that includes an edge and a center of the substrate when the substrate is placed in the optical cavity.

In other versions of the fourth embodiment the substrate may be moved by rotating the substrate about an axis that is perpendicular to the reference surfaces and off-center with respect to a symmetry axis of the reference flats, or translating the substrate along a direction parallel to the reference surfaces.

BRIEF DESCRIPTION OF THE DRAWINGS

Other objects and advantages of the invention will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the present invention take advantage of the fact that an interferometer system with two phase-shifting interferometers facing two sides of the wafer, as in U.S. Pat. No. 6,847,458, is able to measure the surface height on both sides simultaneously. In addition, by placing two parallel reference flats very close to wafer surfaces it is possible to minimize the non-common path of the optical setup by using Fizeau interferometers to improve the accuracy and repeatability of the measurement. A system with two reference flats that are parallel and with either reference flats or at least one reference flat placed very close to the wafer front- or backside surfaces is able to damp down the wafer vibration passively and effectively. Furthermore, such a configuration tends to be mechanically balanced and relatively immune to low frequency vibrations.

Figure 1:
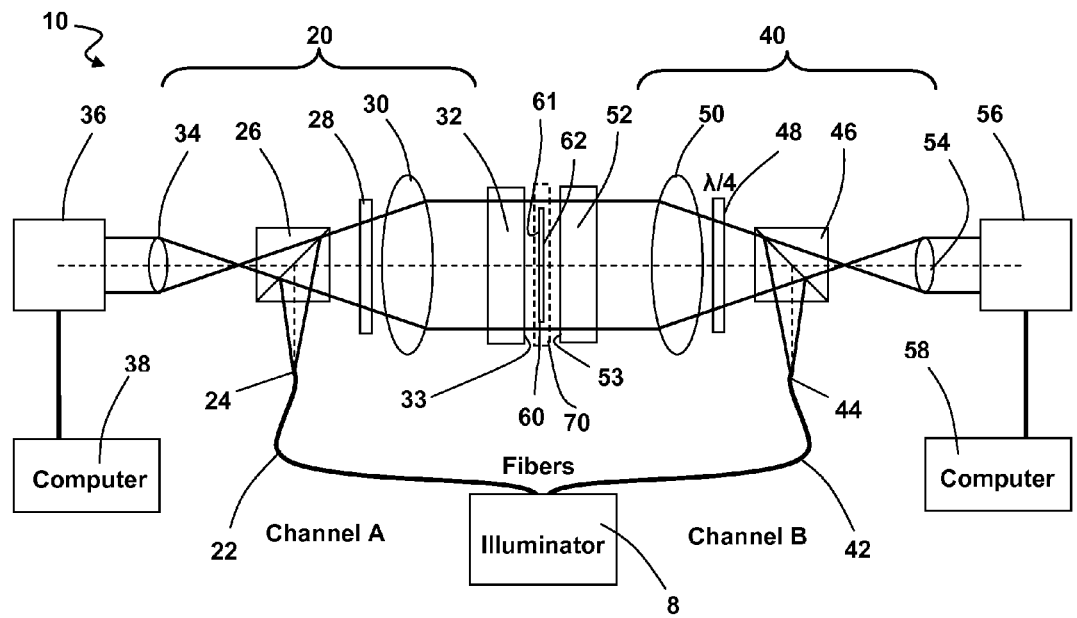
FIG. 1 is a diagrammatic representation of an interferometer system for measuring thickness and shape variation of a substrate according to an embodiment of the present invention.

Embodiments of the present invention may be used with an interferometer system 10 configured in a manner similar to that depicted in U.S. Pat. No. 6,847,458, as illustrated in FIG. 1. Such a system may be used to measure shape and thickness for a planar and opaque substrate, such as a semiconductor wafer. For a wafer measurement, a substrate 60 (e.g., a semiconductor wafer) may be placed in an optical cavity in a center between two improved Fizeau interferometers 20 and 40, such that both surfaces 61 and 62 of the substrate are minimally obscured by holding devices. The interferometers 20 and 40 operate as follows: incident light emerges from light sources 24, 44. The incident light may be provided via two different channels, Channel A and Channel B, e.g., through optical fibers 22 and fiber 42 from a single illuminator 8. By way of example, and not by way of limitation, the illuminator 8 may include a single light source or of multiple light sources with different coherence lengths and wavelength bandwidths. In this example, the light sources 24, 44, are the ends of the fibers 22, 42. Although Fizeau interferometers are depicted in the Example shown in FIG. 1, other types of interferometer configurations may be used for the interferometers 20, 40.

The light emitted from the light sources 24, 44 passes through quarter-wave plates 28, 48 aligned at 45 degree to the polarization direction of light after it is reflected from the polarizing beam splitters 26, 46. These beams then propagate to lenses 30, 50, where they are collimated with a beam diameter, which may be larger than the wafer diameter. The beams then go through transmission flats 32, 52. A central part of each transmitted beam is reflected at a corresponding test surface 61, 62 of the substrate 60. The reflected parts of the transmitted beams form interferograms with light beam reflected from corresponding reference surfaces 33, 53 of the flats 32, 52. The optical cavity generally corresponds to a space between the reference surfaces 33, 53. An outer part of each transmitted beam travels on to the opposite reference flat 52, 32, where it is reflected at the reference surface 53, 33 to form annular shape interferograms with the light beams reflected from the reference surfaces 33, 53 too. Cameras 36, 56 record these interferograms and send them to one or more computers 38, 58 for processing to produce desired information such as information relating to the shape and the thickness variation or absolute thickness of the wafer 60.

It is noted that if the reference flat is sufficiently close to the wafer surface, the wafer becomes very stable. Placing one or two reference flats very close to the entire wafer surface has the beneficial effect of damping down the wafer vibration. According to an embodiment of the present invention, one or both of the reference flats 32, 52 are placed sufficiently close to the wafer 60 that the wafer is stabilized. By way of example, the distance between at least one of the reference flat surfaces 33, 53 and a corresponding wafer surface 61, 62 may be less than 1 mm. Such stabilization is believed to be the result of a film of air or gas between the wafer surface and reference flat that acts to damp out vibration of the wafer. It is noted that such air film damping has been used for wafer edge handling and also been used to dampen vibration in telescopes. However, to the Applicants knowledge, air film damping has not been implemented using an air gap in a common optical path for an interferometer.

It is noted that the illuminator 8 may provide either monochromatic light or light of multiple wavelengths. One advantage to using multiple wavelength light, e.g., "white" light, is that different wavelengths may be used to penetrate different layers of a film on a surface of the wafer 60. If white light is used, it is desirable that the path differences for the interferometers be made sufficiently short due to the relatively short coherence length for white light.

Figure 2:
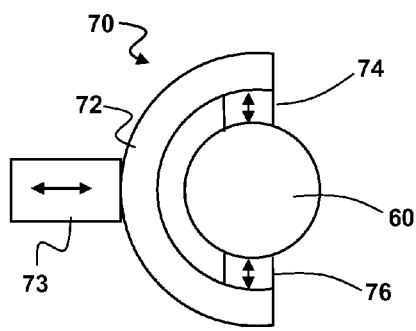
FIG. 2 is a front view diagrammatic representation of a wafer being held by its edge for insertion into the system of FIG. 1.
Figure 3:
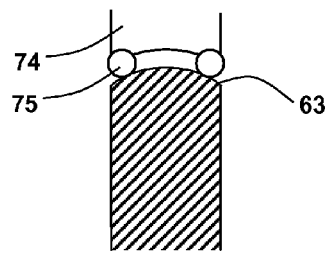
FIG. 3 is a close-up edge view diagrammatic representation of a portion of the wafer and holder depicted in FIG. 2.

To facilitate placement of the wafer 60 within the optical cavity formed between the reference surfaces 33, 53 the system 10 may include a substrate holder 70 that is adapted to receive the substrate and translate the substrate along a direction parallel to a plane of the substrate into a gap between the reference surfaces 33, 53. By way of example, and not by way of limitation, the substrate holder 70 may be configured as shown in FIG. 2. Specifically, the substrate holder 70 may include a frame 72 that is open at one end to receive the wafer 60. The wafer 60 may be held in a vertical orientation within the gap between the reference surfaces 33, 53. By way of example, the frame 72 may be "C" shaped. The frame 72 may be mounted to a translation mechanism 73, e.g., a mechanical actuator, which allows for translation of the frame along a direction parallel to a plane of the wafer 60. The substrate holder 70 includes two or more edge holders 74, 76 attached to the frame 72. The edge holders 74, 76 are adapted to grab the wafer 60 by its edge. The edge holders 74, 76 may move as indicated by the arrows to grab hold of or release the wafer 60. As seen in the close-up depicted in FIG. 3, an edge holder 74 may include one or more compliant members 75 that retain the wafer 60 by its edge 63. The compliant members are made of a suitably compliant material to avoid damaging the wafer while it is being grabbed or held by the edge holders 74, 76. The edge holders 74, 76 may be sized such that are narrower than the gap between the two reference surfaces 33, 53.

It is noted that an interferometer system with two reference flats that are parallel and very close to wafer surfaces is able to greatly improve the accuracy of determining the absolute thickness of wafer directly from the speed of phase shift during acquisition. An interferometer system with two reference flats that are parallel with both or at least one reference flat placed very close to the wafer surfaces makes it possible to use a quasi monochromatic light source or a white light with very narrow band filter for Fizeau interferometers (as long as its coherence length greater than the twice of the gap between the reference flat and the wafer surface). Thus such a system may not only minimize system measurement errors but also may extend the system's measurement capability for different applications including film or patterned surfaces.

In addition, an interferometer system with two reference flats, may measure the thickness variation of a wafer without the errors that typically result from the cavity path difference or from the shape of the reference flats.

An interferometer system with two reference flats that are larger sized than the wafer being measured is able to monitor the tilt change of reference flats with two reference flats with every measurement. Such a capability may significantly increase the repeatability of measurements taken with such a system. An interferometer system with two reference flats that are larger sized than the measuring wafer is also able to determine the location of a testing wafer in the imaging plane very precisely without the influence of the surface slopes at the edge of the wafer.

Furthermore, an interferometer system with two reference flats may measure the surface height on both sides and thickness variation of a wafer without being influenced by the wafer material.

Figure 4:
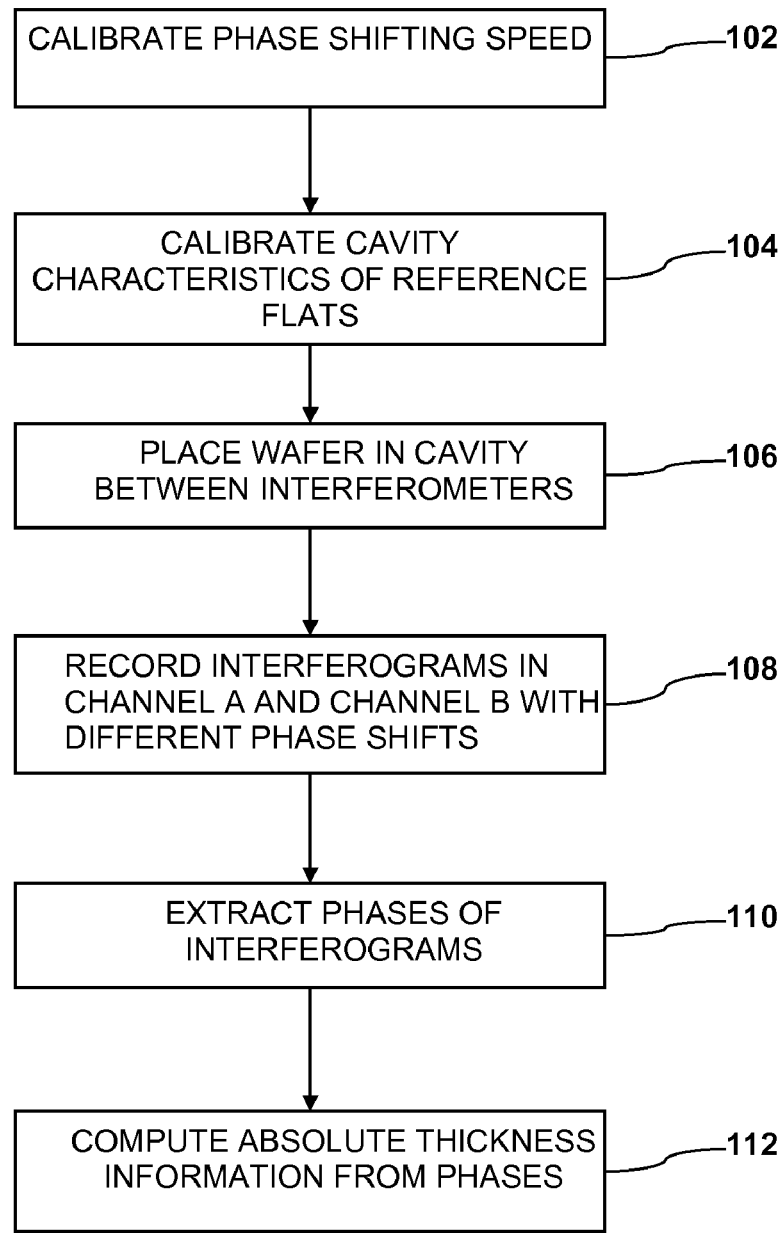
FIG. 4 is a flow diagram illustrating a method for determining substrate shape or thickness information according to an embodiment of the present invention.

According to another embodiment of the present invention a method for measuring a shape and thickness information of a substrate may be implemented with the system of FIG. 1. As used herein, shape or thickness information includes, but is not limited to thickness variation of a substrate and absolute thickness of the substrate. An example of such a method is illustrated in the flow diagram of FIG. 4. The method 100 may be understood by referring simultaneously to FIG. 1 and FIG. 4. Such a method may be implemented, either in whole or in part under the control of computer software running on one or more of the computers 38, 58.

The phase shifting speed of the system may optionally be calibrated, as indicated at 102. By way of example, and not by way of limitation, a polished opaque plate may be placed in the cavity formed between reference surfaces 33, 53 for this purpose. Alternatively, calibration may be performed using the cavity itself. The cavity characteristics of the reference flats may also be calibrated, as indicated at 104. The reference flat calibration procedure may produce interferograms that indicate a variation of the spacing between the reference surfaces 33, 53 over the region in which the wafer 60 is to be placed.

The substrate being measured, e.g., wafer 60 may be placed in the cavity between two Fizeau interferometers, as indicated at 106. By way of example, the substrate holder 70 may move the wafer 60 into position under control of one of the computers 38, 58. The substrate may be placed in the center of the cavity or off-center, to receive light at normal incidence via channel A and channel B, such that both wafer test surfaces 61 and 62 are minimally obscured by the holding mechanism 70. At least one test surface is placed a distance less than or equal to 3 millimeters, preferably less than or equal to two millimeters, more preferably less than or equal to 1.5 millimeters and still more preferably less than or equal to one millimeter from a corresponding nearby reference surface.

Two sets of intensity frames that record interferograms in Channel A and Channel B with different phase shifts may then be collected, as indicated at 108. Difference phase shifts may be obtained, e.g., by varying the wavelength of light produced by the illumination source 8. Alternatively, different phase shifts may be obtained by shifting the reference flats 33, 53 relative to the wafer 60. Once the interferograms have been collected, phases of the interferograms may be extracted from the intensity frames, as indicated at 110. Desired information regarding the shape and/or thickness of the substrate may then be computed from these phases, as indicated at 112. Such information may be presented in the form of one or more maps that illustrate the shape or thickness information with respect to location on a surface of the substrate.

There are a number of different ways to compute such information. For example, assume A is the phase of interferogram formed by the reference flat 33 and corresponding wafer test surface 61, B is a phase of interferogram formed by the reference flat 53 and wafer test surface 62, and C is a phase of interferogram formed by the cavity between the two reference surfaces 33, 53. Thus A gives surface height information for test surface 61, B gives surface height information for test surface 62, and C−(A+B) gives the thickness variation of the wafer 60.

Using this technique it is possible to computing the absolute wafer thickness at one, multiple, or for all surface coordinates if the phase is shifted by wavelength change. Absolute thickness may be computed from the amount of phase shift per known wavelength change. In this example, A is the phase shift of interferogram formed by the reference surface 33 and the wafer test surface 61, B is the phase shift of interferogram formed by the reference surface 53 and wafer test surface 62, and C is the phase shift of interferogram formed by the cavity between the two reference surfaces 33, 53. Thus, A gives the absolute distance between reference surface 53 and wafer test surface 62, B gives the absolute distance between reference surface 33 and wafer test surface 61, and C gives the absolute distance between reference surface 33 and reference surface 53, and C−(A+B) gives the absolute wafer thickness.

There are several advantages of the foregoing system and method over the system and method described in U.S. Pat. No. 6,847,458. Specifically, the system stability and/or repeatability of measurements made with the system may be greatly improved. Furthermore, the system and method described above allow the ability to use illumination having short temporal coherent length. In addition, the non-common path of the interferometers and/or measurement errors may be minimized. In addition, absolute wafer thickness information may be provided with the system and method described above. The system and method described in U.S. Pat. No. 6,847,458, by contrast, can only provide information regarding thickness variation.

There are several advantages of the foregoing system and method over the system and method described in U.S. Pat. No. 7,009,696. For example, the system and method described above have the ability to use illumination with short temporal coherence length, minimize, non-common interferometer path and measurement errors and provide absolute wafer thickness information. In addition, the system and method may provide a single- or double-sided, full wafer damping arrangement. Furthermore, the system and method described above may use normal incidence illumination.

Figure 5:
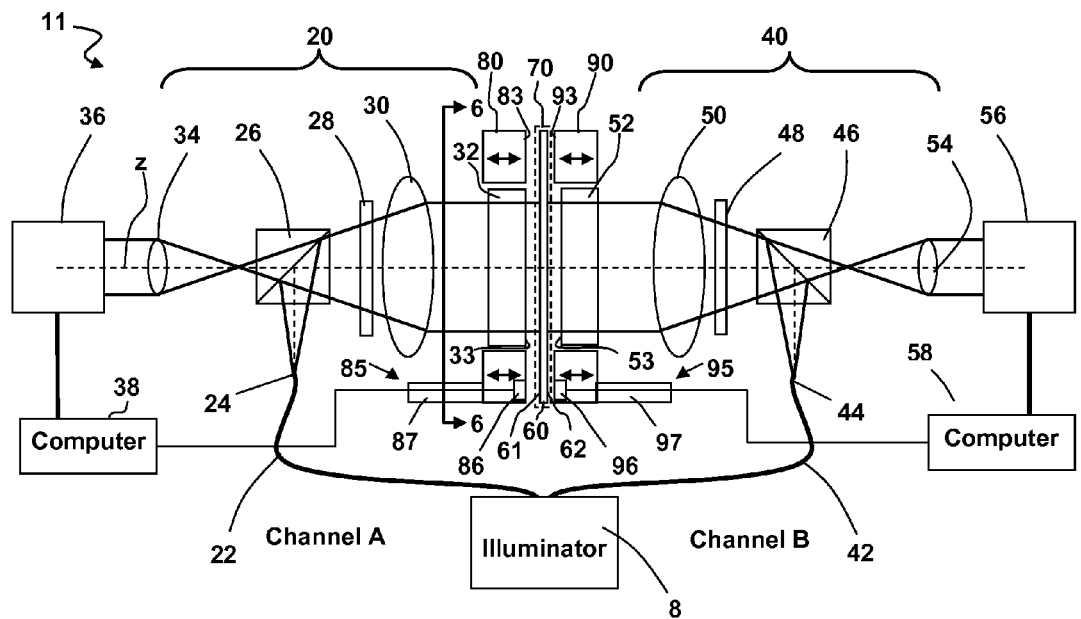
FIG. 5 is diagrammatic representation of an interferometer system for measuring thickness and shape variation of a substrate according to an alternative embodiment of the present invention.

A number of enhancements to the embodiments described above are possible. For example, according to an alternative embodiment of the present invention illustrated in FIG. 5 and FIG. 6, vibration damping of a substrate 60 may be enhanced through the use of damping plates that overlap portions of the substrate that are not covered by the reference plates 32, 52. Specifically, as shown in FIG. 5, an alternative interferometer system 11 may be based on the system 10 illustrated in FIG. 1. In FIG. 5 those reference numerals that are the same as reference numerals in FIG. 1 refer to the same element described above with respect to FIG. 1.

Figure 6:
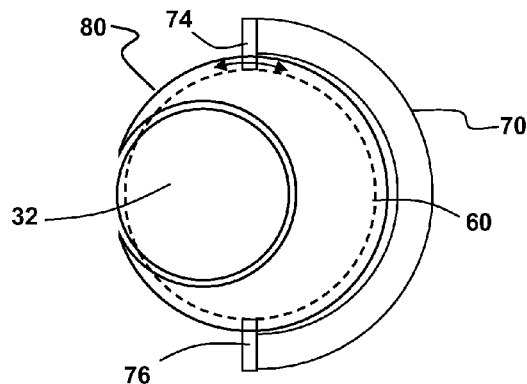
FIG. 6 is a plan view of the interferometer system taken along line 6-6 of FIG. 5.

The system 11 differs from the system 10 in that the transmission flats 32, 52 are smaller in diameter than the substrate 60. By way of example, the transmission flats 32, 52 may be 300 millimeters in diameter and the substrate 60 may be 450 millimeters in diameter. Consequently, the reference surfaces 33, 53 of the transmission flats 32, 52 do not completely overlap the surfaces 61, 62 of the substrate 60. The system 11 includes one or more damping plates 80, 90 and a positioning mechanisms 85, 95 coupled to the damping plates. Each of the damping plates 80, 90 is located proximate a corresponding portion one of the surfaces 61, 62 of the substrate 60 that does not overlap one of the reference surfaces 33, 53. The damping plates 80, 90 have damping surfaces 83, 93 that are configured to be respectively oriented substantially parallel to the surfaces 61, 62 of the substrate 60 when the substrate is placed in the cavity between the reference surfaces 33,53, e.g., by the substrate holder 70. As used herein, the term "substantially parallel" is meant to allow for some acceptable degree of deviation of the respective surfaces from being exactly parallel due to finite tolerances of manufacturing and alignment. The damping surfaces 83, 93 may be manufactured to a degree of flatness and smoothness similar to that of the reference surfaces 33, 53. By way of example, and not by way of limitation, as seen in FIG. 6, the damping plates 80, 90 may be more or less crescent shaped with an inner diameter equal to or slightly larger than the outer diameter of the transmission flats 32, 52 and an outer diameter equal to or larger than a diameter of the substrate 60 (shown in phantom). This provides a space sized and shaped to receive the transmission flats.

By way of example, and not by way of limitation, as depicted in FIG. 6, the damping plates 80, 90 and transmission flats 32, 52 may be configured with a circular symmetry in which a center of the damping plates and central axis of the substrate 60 are more or less concentric with respect to each other and off-center with respect to an optical axis z of the interferometer and transmission flats. In such a configuration, the damping plates may overlap a significant portion of a substrate 60 that has a larger diameter than the transmission flats 32, 52. Although the transmission flats 32, 52 do not overlap the entire surface of the substrate 60, the system 11 may still inspect a sufficient portion of the surface for many practical applications. For example in the configuration shown in FIG. 6, the transmission flats 32, 52 overlap a portion of the substrate 60 that includes both the edge of the substrate and its center. For interferometric measurements of wafers during production runs, this is often sufficient. If inspection of the entire surface of the substrate 60 is desired, the substrate 60 may be rotated about its center, as show by the doubled ended curved arrows in FIG. 6, and multiple measurements may be made at different angles of rotation. In some cases, it may be desirable to perform such measurements, e.g., only for one wafer from a given ingot and only measure other wafers from that ingot at the center and edge without rotating them.

There are a number of ways to rotate the substrate. For example, in some cases, the substrate 60 may be removed from the gap between the transmission flats 32, 52 by the substrate holder 70 and transferred to an orienting mechanism that rotates the substrate. The substrate holder 70 may then retrieve the rotated substrate and place it back in the gap. Alternatively, the substrate holder 70 may itself be configured to rotate the substrate 60 about its center while it is in situ between the transmission flats 32, 52.

It is noted that in interferometer systems of the type shown in FIG. 1 and FIG. 5, the transmission flats 32, 52 are normally not movable because they are part of the optics. Due to limitations on the ability of the substrate holder 70 to position the substrate 60 within the gap between the reference surfaces 33, 53 it may be impractical to make the gap small enough that the substrate 60 can be positioned so that the substrate surfaces 61, 62 are sufficiently close to the reference surfaces 33, 53 for the reference surfaces to provide as high a degree of damping as may be desired.

However, in the interferometer system 11, because, the damping plates 80, 90 are not part of an optical path of the interferometer, they may be made movable. This allows the damping plates 80, 90 to be selectively positioned so as to place them very close to portions of the substrate surfaces 62, 63 to provide vibration damping due to proximity of the damping surfaces 83, 93 to portions of the substrate surfaces that do not overlap the reference surfaces 33, 53. By selectively positioning the damping plates the interferometer system 11 may compensate for less than optimal spacing of the reference surfaces 33, 53 for the purposes of vibration damping by providing additional damping with the moveable damping plates 80, 90. By making the damping surfaces 83, 93 sufficiently large compared to the transmission flats 32, 52, the damping plates may provide a majority of the vibration damping for the substrate 60.

To facilitate close positioning of the damping surfaces, the positioning mechanisms 85, 95 may move the damping plates 80, 90 perpendicular to the reference surfaces 33, 53. Each positioning mechanism 85, 95 may be configured to position the damping plates 80, 90 with sufficient precision that the damping surfaces 83, 93 can be placed 3 millimeters or less from the surfaces 61, 62 of the substrate 60. Once positioned, the damping plates 80, 90 may then be locked into position for measurement of the substrate 60 by the interferometer system 11.

By way of example, and not by way of limitation, the positioning mechanisms may include sensors 86, 96 and actuators 87, 97 that are respectively coupled to computers 38, 58. The sensors 86, 96 may be any type of proximity sensors that are responsive to the proximity of the substrate surfaces 61, 62 to the sensors 86, 96. Examples of suitable sensors include, but are not limited to capacitance sensors and optical sensors. The actuators 87, 97 may be servo mechanisms that are coupled to the sensors 86, 96 and computers 38, 58 in feedback loops. The feedback loops may be configured so that the servo mechanisms respond to changes in the spacing between the damping surfaces and substrate surfaces as measured by the sensors by moving the damping plates in such a way as to counteract the sensed change in the spacing. By operating in such a manner the positioning mechanisms 85, 95 may stabilize a distance between the reference surfaces 83, 93 and the substrate surfaces 61, 62.

In some implementations, the positioning mechanisms 85, 95 may be configured to move the damping plates perpendicular to the first or second surface of the substrate by a distance sufficient to allow the substrate holder 70 to place the substrate 60 between the reference surfaces 33 and 53.

Although two damping plates and two positioning mechanisms are depicted in FIG. 5, for the purposes of example, it is noted that in some implementations the interferometer 11 may have a single damping plate and a single corresponding positioning mechanism.

It is noted that a system of the type depicted in FIG. 5 and FIG. 6 is less expensive to develop for larger sized wafers (e.g., 450 mm diameter wafers) than a system having larger diameter transmission flats. Previously developed optical components from existing smaller diameter (e.g., 300 mm) systems may be adapted for use in a system of the type shown in FIG. 5. Thus, development of larger diameter optical components for an interferometer of the type shown in FIG. 1 would not be required. Furthermore, a system of the type shown in FIG. 5 and FIG. 6 can have higher performance than a larger diameter system of the type shown in FIG. 1 as a result of the enhanced vibration damping from the damping plates 80, 90. This can be a significant advantage where large diameter (e.g., 450 mm) wafers are to be used for smaller and smaller (e.g., 15 nm) design rules.

Figure 7:
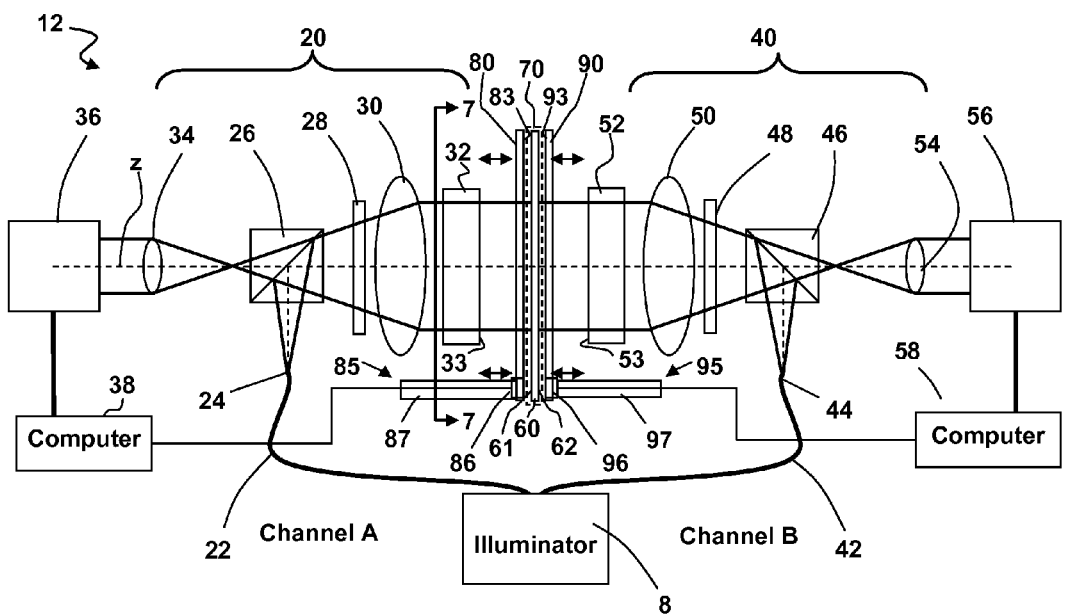
FIG. 7 is a diagrammatic representation of an interferometer system for measuring thickness and shape variation of a substrate according to another alternative embodiment of the present invention.

A modified system of the type shown in FIG. 5 and FIG. 6 may place the reference flats 32, 52 much further from the wafer and rely entirely on the proximity of the damping plates 80, 90 to provide vibration damping. By way of example, such a system 12 may be configured as shown in FIG. 7. In FIG. 7, components in common with FIG. 1 and FIG. 5 are indicated by the same reference numerals as used in FIG. 5 and FIG. 7. In this embodiment, the reference flats 32, 52 may be much further away from each other than the damping plates 80, 90. As in the apparatus 11 depicted in FIG. 5, the damping plates 80, 90 may include an opening that is sized and shaped so as not to obscure a field of view defined by the reference flats 32, 52.

Like, the embodiments depicted above with respect to FIG. 1 and FIG. 5, this embodiment may take advantage of the fact that an apparatus with two phase-shifting Fizeau interferometers facing two sides of the wafer, as in (U.S. Pat. No. 6,847,458 B2, January 2005), is able to measure the surface height on both sides simultaneously. In addition, a system with two reference flats facing two sides of the wafer 60 is able to measure the thickness variation of a wafer without the errors resulting from the cavity path difference or from the shape of reference flats. Furthermore, a system with a normal incidence optical arrangement is able to minimize non-common path of optical setup by using Fizeau interferometers that improve the accuracy and repeatability of the measurement.

The system with two damping plates 80, 90 that are parallel to each other and both or at least one damping plate placed very close to wafer front- or backside surfaces 61, 62 is able to damp down the wafer vibration passively and effectively, and being mechanically balanced is substantially immune to low frequency vibrations. A system with one or more damping plates that are not in the optical path of the optical system is able to place the damping plate (or plates) very close to wafer surfaces. Thus it is able to damp down the wafer vibration effectively without demanding stringent requirements on the continuous wavelength tuning range of a light source and on the mechanical wafer handling. The damping plate area can be smaller than the wafer area to allow space for a robust wafer handling.

A system with two reference flats 32, 52 is able to measure the surface height on both sides of the wafer and thickness variation of the wafer without the influence of wafer material.

Figures 8A, 8B:
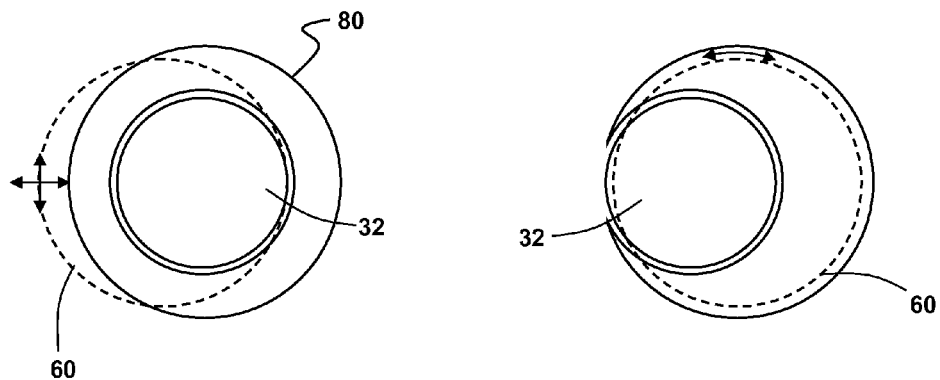
FIGS. 8A-8C are diagrammatic plan views showing a portion of the interferometer system of FIG. 7.

To map an entire surface of the wafer, the wafer holder 70 may move the wafer 60 parallel to the reference flats 32, 52 so that different portions of the wafer surfaces 61, 62 are within the field of view of the interferometers 20, 40. Interference maps of the front and/or back surfaces 61, 62 may be taken with the wafer in different positions. By way of example, and not by way of limitation, the wafer may be moved by translating the wafer 60 parallel to the damping surfaces 83, 93 as depicted in FIG. 8A. Alternatively, the wafer 60 may be rotated about an axis that is off center from and parallel to the optical axis z, as illustrated in FIG. 8B. The computers 38, 58 may stitch these maps (sometimes referred to as submaps) together to provide interference maps that cover the entire front and/or back surface of the wafer with submap stitching is able to increase the measuring area without increasing FOV of the measuring system. Such submap stitching allows the system 12 to be flexible enough to measure wafers with different wafer sizes without sacrificing spatial resolution of the measurement. Such high spatial resolution is critical for example in inspecting edge regions of the wafer.

In certain applications it is enough to qualify wafer flatness by measuring only fraction of wafer surface, provided that this fraction covers center-to-edge over a substantial area. In such cases it is sufficient to perform a single sub-aperture scan, or a small number of them.

In some embodiments the wafer 60 may be positioned so that it does not completely obscure the field of view of the interferometers. Such a configuration allows the system 12 to measure the part of the cavity between the reference surfaces 33, 53 that is not obscured by part of the wafer while also measuring the wafer. This allows the system 12 to monitor changes in tilt of the reference flats 32, 52 with every measurement. Such a capability can significantly increase the repeatability of measurements made with the system 12.

The system that is able to measure the cavity outside of the area blocked by the wafer while it measures the wafer is able to determine the location of a test wafer in the imaging plane very precisely without the influence of surface slopes at the edge of the wafer. This allows the system to stitch submaps together more accurately.

Figure 8C:
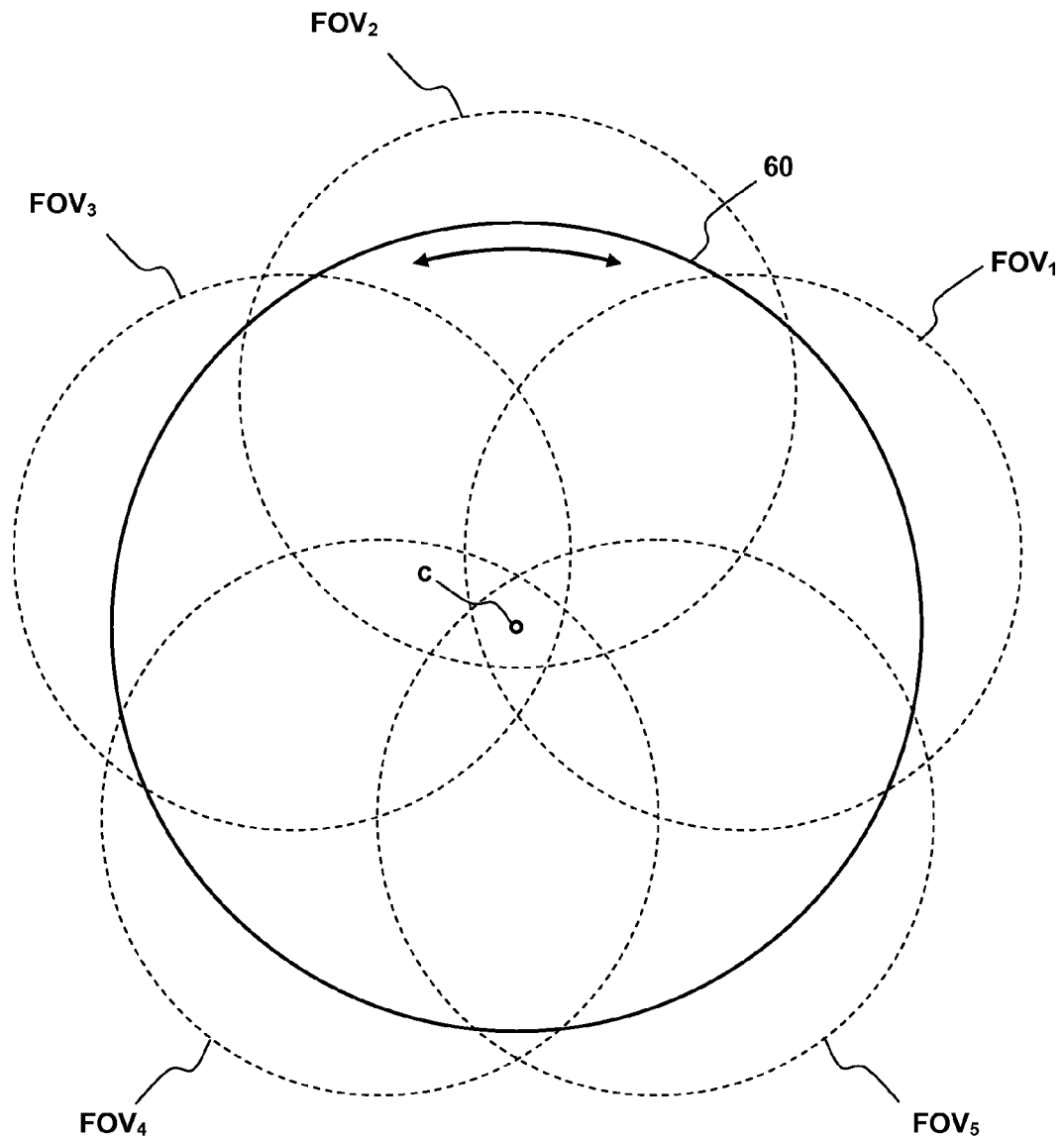

FIG. 8C illustrates an example of how the wafer may be positioned relative to the reference flats so that the wafer does not completely obscure the field of view of the interferometers as the wafer is moved. In this example, the wafer rotates about an axis c that is off-center from an axis of the reference flats, which is also the optical axis z. The reference flats, which are assumed to have circular symmetry, define a field of view having essentially the same diameter as the reference flats (assuming they have the same diameter). At different angles of rotation of the wafer different portions of the wafer 60 are within the field of view. These different portions lie within different fields of view $FOV_1$, $FOV_2$, $FOV_3$, $FOV_4$, and $FOV_5$. Note that the wafer 60 only partly overlaps each field of view, leaving part of each field of view unblocked by the wafer. Interference maps of the portions of the wafer within each field of view may be taken at each of these angles. In addition, the interferometers 20, 40 may measure cavity characteristics for the portions of the field of view that are not blocked by the wafer 60.

Figure 9:
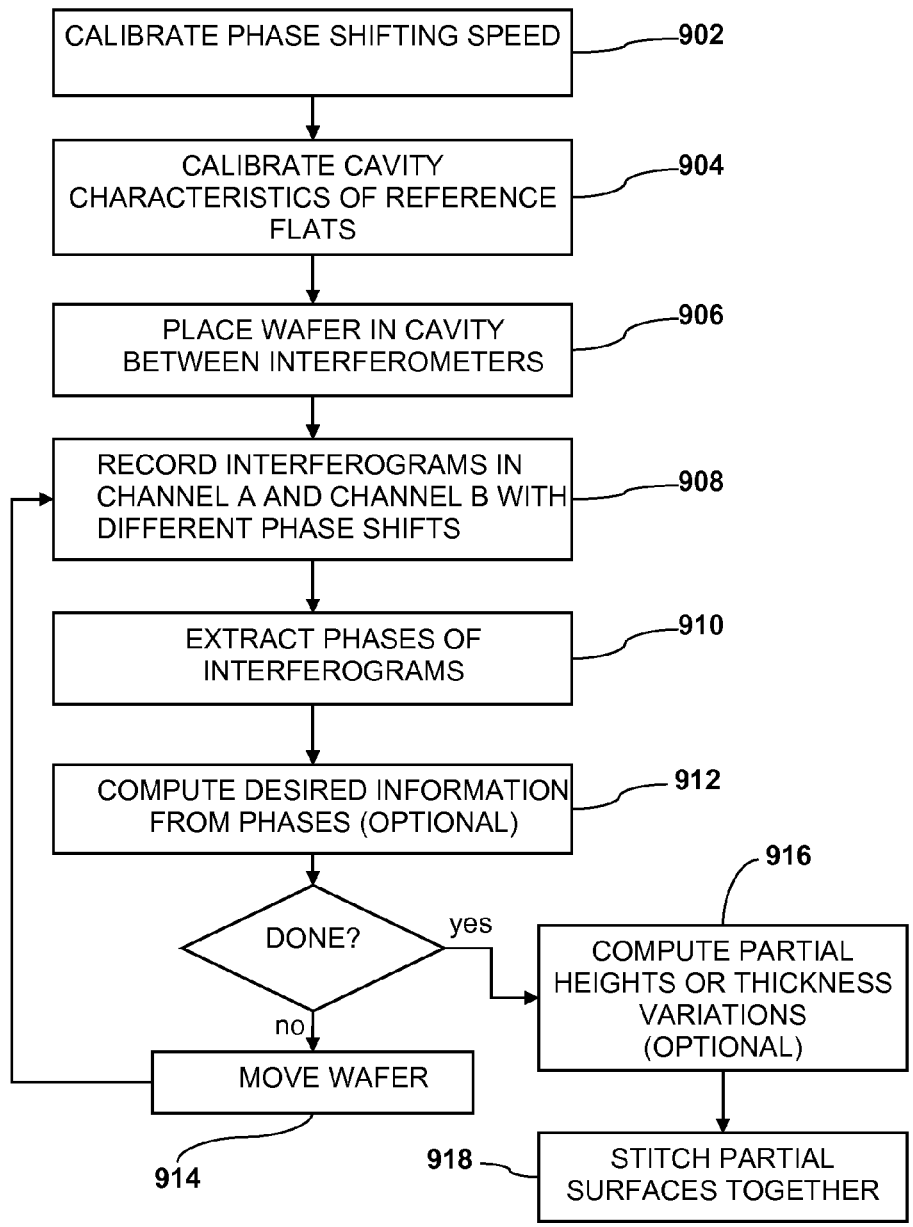
FIG. 9 is a flow diagram illustrating a method for measuring a shape and thickness information of a substrate using a system of the type shown in FIG. 5 or FIG. 7.

A system of the type shown in FIG. 5 or FIG. 7 may be used to implement a method for measuring a shape and thickness information of a substrate. An example of such a method is illustrated in the flow diagram of FIG. 9. The method 900 may be understood by referring simultaneously to FIG. 7 and FIG. 9. Such a method may be implemented, either in whole or in part under the control of computer software running on one or more of the computers 38, 58.

The method may proceed as follows. The phase shifting speed may be calibrated as indicated at 902. By way of example, a polished opaque plate may be placed in the cavity formed between the reference surfaces 33, 53 of the reference flats 32, 52. Alternatively, the phase shifting speed may be calibrated by the cavity itself. The cavity characteristics of the reference flats 32, 52 may be calibrated as indicated at 904. The measuring wafer 60 may be placed in the cavity as indicated at 906. The wafer may be placed either in the center or off-center between the damping plates 80, 90 and Fizeau interferometers 20, 40 such that both wafer sides 61 and 62 are minimally obscured by the wafer holder 70. Two sets of intensity frames that record interferograms in Channel A and Channel B are acquired with different phase shifts as indicated at 908. The different phase shifts may be obtained, e.g., by varying the wavelength of the light source 8 or by shifting the reference flats relative to the wafer or the wafer relative to the reference flats. Phases of the interferograms may be extracted from these intensity frames as indicated at 910. Desired information may optionally be computed from these phases as indicated at 912. By way of example, if A is the phase of an interferogram formed by the front reference flat 32 and the front wafer surface 61, B is the phase of interferogram formed by the back reference flat 52 and the back wafer surface 62, and C is the phase of interferogram formed by the cavity of two reference flats 32, 52. Thus A gives the front surface height, B gives the back surface height, and $C-(A+B)$ gives the thickness variation. The wafer holder 70 may then move the wafer 60 to another predefined location to measure a different area of the wafer as indicated at 914. The operations indicated at 908, 910, 912, and 914 may be repeated as many times as necessary until all parts of wafer surface have been measured. Partial surface heights or the thickness variations of the wafer from each set of intensity frames may be computed at 916, the desired information was not computed as indicated at 912. All partial surface measurements that overlap each other may be stitched together as indicated at 918 to accomplish a measurement that covers the entire wafer surface.

There are advantages of the above-described method and system over the prior. For example, the method and system are flexible enough to allow measurement of wafers of different sizes including very large (e.g., 450 millimeter diameter) wafers. The system also has a relatively low cost compared to a large diameter optical system since it may utilize optics of a diameter smaller than the wafer. Existing systems may be easily adapted to provide for movement of the wafer and digital image processing to provide for stitching together of interferograms of different overlapping parts of the wafer. Furthermore, the system can have a high degree of spatial resolution. In addition, the use of normal illumination interferometers (e.g., Fizeau interferometers) minimizes the non-common path of the optical arrangement.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. An interferometer apparatus for measuring shape or thickness information of a substrate including in combination:
   first and second spaced apart reference flats having corresponding first and second parallel reference surfaces forming an optical cavity therebetween for placement of the substrate;
   a substrate holder configured to place the substrate in the cavity between the reference flats such that first and second surfaces of the substrate are substantially parallel with corresponding first and second reference surfaces of the first and second reference flats and such that the first or second surface of the substrate is 3 millimeters or less from a corresponding one of the first or second reference flat, the proximity between the first or second surface of the substrate and the corresponding reference surface of the first or second reference flat being sufficiently close to shield the substrate from vibration; and
   first and second interferometer devices located on diametrically opposite sides of the cavity and optically coupled thereto, the first and second interferometers being respectively operable to map variations in spacing between the first and second surfaces of the substrate and the first and second reference surfaces, respectively through interference of light optically coupled to and from to the cavity via the first and second interferometer devices.

2. The apparatus of claim 1, further comprising first and second interferogram detectors and at least one computer coupled to receive the outputs of the first and second interferogram detectors for determining thickness variations of the substrate.

3. The apparatus of claim 1 wherein the first and second reference flats have dimensions such that an oversized field of view is provided for the substrate.

4. The apparatus of claim 1 wherein the first and second interferometer devices are Fizeau interferometers.

5. The apparatus of claim 1, further comprising one or more light sources optically coupled to the first and second interferometer devices.

6. The apparatus of claim 5 wherein the one or more light sources include a source of light configured to produce light of multiple wavelengths.

7. The apparatus of claim 5 wherein the one or more light sources include one or more sources of white light.

8. The apparatus of claim 5 wherein the one or more light sources include an illuminator and first and second optical fibers coupled between the illuminator and the first and second interferometer devices respectively.

9. The apparatus of claim 1 wherein the substrate holder includes an open ended frame adapted to receive the substrate and two or more edge holders attached to the frame and adapted to hold the substrate by an edge thereof.

10. The apparatus of claim 9 wherein the edge holders are sized to fit within a gap between the first and second reference surfaces of the reference flats.

11. The apparatus of claim 1 wherein the substrate holder is configured to place the substrate in the cavity between the reference flats such that first and second surfaces of the substrate are substantially parallel with corresponding first and second reference surfaces of the first and second reference flats and such that the first or second surface of the substrate is 2 millimeters or less from a corresponding one of the first or second reference flat.

12. The apparatus of claim 1 wherein the substrate holder is configured to place the substrate in the cavity between the reference flats such that first and second surface of the substrate are substantially parallel with corresponding first and second reference surfaces of the first and second reference flats and such that the first or second surface of the substrate is one millimeter or less from a corresponding one of the first or second reference flat.

13. The apparatus of claim 1, wherein the first and second reference flats are of a size smaller than the substrate, whereby a portion of the first or second surface of the substrate does not overlap the first or second reference surface, the apparatus further comprising:
   at least one damping plate proximate the portion of the first or second surface of the substrate that does not overlap the first or second reference surface, the at least one damping plate having a damping surface configured to be oriented substantially parallel to the first or second surface of the substrate when the substrate holder places the substrate in the cavity; and
   a positioning mechanism coupled to the damping plate, wherein the positioning mechanism is operable to position the damping plate such that the damping surface is three millimeters or less from the first or second surface of the substrate.

14. The apparatus of claim 13, wherein the positioning mechanism is operable to move the damping plate perpendicular to the first or second surface of the substrate by a distance sufficient to allow the substrate holder to place the substrate between the first and second reference surfaces.

15. The apparatus of claim 13, wherein the at least one damping plate comprises a first damping plate and a second damping plate, wherein the first damping plate overlaps a portion of the first surface of the substrate that does not overlap the first reference surface, the first damping plate having a first damping surface oriented parallel to the first reference surface, and wherein the second damping plate overlaps a portion of the second surface of the substrate that does not overlap the second reference surface, the second damping plate having a second damping surface oriented parallel to the second reference surface.

16. The apparatus of claim 15, wherein the positioning mechanism includes a first actuator coupled to the first damping plate and a second actuator coupled to the second damping plate, wherein the first actuator is operable to position the first damping plate such that the first damping surface is two millimeters or less from the first surface of the substrate, wherein the second actuator is operable to position the second damping plate such that the second damping surface is two millimeters or less from the second surface of the substrate.

17. The apparatus of claim 13 wherein the at least one damping plate, the substrate holder and the first and second reference flats are oriented such that a center of the reference flats is off-center with respect to a center of the at least one damping plate and a center of the substrate when the substrate is placed in the optical cavity.

18. The apparatus of claim 17 wherein an edge of the substrate is located proximate an edge of the first and second reference flats when the substrate is placed in the optical cavity.

19. The apparatus of claim 17 wherein the first and second reference flats have a diameter that is sufficiently large that the first and second reference flats overlap a portion of the substrate include an edge and a center of the substrate when the substrate is placed in the optical cavity.

20. The apparatus of claim 13 wherein the substrate holder is configured to rotate the substrate about an axis that is perpendicular to the reference surfaces and off-center with respect to a symmetry axis of the reference flats while the substrate is placed in the optical cavity, or wherein the substrate holder is configured to translate the substrate along a direction parallel to the reference surfaces while the substrate is in the optical cavity.

21. A method for measuring shape or thickness information of a substrate, comprising:
    placing a substrate in an optical cavity formed between first and second reference flats in first and second interferometer channels to map first and second test surfaces of the substrate such that first and second surfaces of the substrate are substantially parallel with corresponding first and second reference surfaces of the first and second reference flats and such that the first or second surface of the substrate is 3 millimeters or less from a corresponding one of the first or second reference flat, the proximity between the first or second surface of the substrate and the corresponding reference surface of the first or second reference flat being sufficiently close to shield the substrate from vibration;
    measuring cavity characteristics of the reference surfaces forming the cavity using the first or second interferometer channels;
    providing a first phase shift in the interferometer channels to map at least a portion of the first and second test surfaces of the substrate;
    providing a second phase shift for measuring the cavity characteristics of the reference surfaces; and
    determining the shape or thickness information of the substrate from interferometer maps of the first and second test surfaces and the cavity characteristics.

22. The method of claim 21, wherein providing the first or second phase shift includes varying a relative distance between the one of the reference surfaces and a corresponding one of the test surfaces.

23. The method of claim 21 wherein the shape or thickness information includes a thickness variation of the substrate.

24. The method of claim 21, wherein providing the first or second phase shift includes varying a wavelength of light used in the first or second interferometer channels.

25. The method of claim 24, wherein shape or thickness information includes an absolute thickness of the substrate.

26. The method of claim 21, wherein the first or second surface of the substrate is 2 millimeters or less from a corresponding one of the first or second reference flat.

27. The method of claim 21, wherein the first or second surface of the substrate is one millimeter or less from a corresponding one of the first or second reference flat.

28. The method of claim 21, wherein the first and second reference flats are of a size smaller than the substrate, whereby a portion of the first or second surface of the substrate does not overlap the first and second reference surface, the method further comprising:
    positioning at least one damping plate proximate the portion of the first or second surface of the substrate that does not overlap the first or second reference surface, the at least one damping plate having a damping surface oriented parallel to the first or second reference surface, wherein the damping plate is positioned such that the damping surface is three millimeters or less from the first or second surface of the substrate.

29. The method of claim 28, further comprising, before placing the substrate in the cavity formed between the first and second reference surfaces, moving the damping plate perpendicular to the first or second surface of the substrate by a distance sufficient to allow the substrate holder to place the substrate between the first and second reference surfaces.

30. The method of claim 28, wherein the at least one damping plate comprises a first damping plate and a second damping plate, wherein the first damping plate overlaps a portion of the first surface of the substrate that does not overlap the first reference surface, the first damping plate having a first damping surface oriented parallel to the first reference surface, and wherein the second damping plate overlaps a portion of the second surface of the substrate that does not overlap the second reference surface, the second damping plate having a second damping surface oriented parallel to the second reference surface.

31. The method of claim 30, wherein positioning the at least one damping plate includes positioning the first damping plate such that the first damping surface is three millimeters or less from the first surface of the substrate.

32. The method of claim 31 wherein positioning the at least one damping plate further includes positioning the second damping plate such that the second damping surface is three millimeters or less from the second surface of the substrate.

33. The method of claim 28 wherein a center of the reference flats is off-center with respect to a center of the at least one damping plate and a center of the substrate when the substrate is placed in the optical cavity.

34. The method of claim 28 wherein an edge of the substrate is located proximate an edge of the first and second reference flats when the substrate is placed in the optical cavity.

35. The method of claim 28 wherein the first and second reference flats have a diameter that is sufficiently large that the first and second reference flats overlap a portion of the substrate that includes an edge and a center of the substrate when the substrate is placed in the optical cavity.

36. The method of claim 28 further comprising rotating the substrate about an axis that is perpendicular to the reference surfaces and off-center with respect to a symmetry axis of the reference flats and interferometrically mapping a different portion of the first and second test surfaces when the substrate is in the optical cavity, or translating the substrate along a direction parallel to the reference surfaces and interferometrically mapping a different portion of the first and second test surfaces while the substrate is in the optical cavity.

37. The method of claim 36 wherein rotating the substrate includes rotating the substrate about its center while the substrate is in the optical cavity.

38. An interferometer system comprising:
    first and second spaced apart reference flats having corresponding first and second parallel reference surfaces forming an optical cavity sized to receive a substrate therebetween, wherein the first and second reference flats are of a size smaller than the substrate, whereby a portion of a first or second surface of the substrate does not overlap the first or second reference surface;
    at least one damping plate proximate the portion of the first or second surface of the substrate that does not overlap the first or second reference surface, the at least one damping plate having a damping surface configured to be oriented parallel to the first or second surface of the substrate when the substrate is placed in the cavity;
    a positioning mechanism coupled to the damping plate, wherein the positioning mechanism is operable to position the damping plate such that the damping surface is three millimeters or less from the first or second surface of the substrate; and first and second interferometer devices located on diametrically opposite sides of the cavity and optically coupled thereto, the first and second interferometers being respectively operable to map variations in spacing between the first and second surfaces of the substrate and the first and second reference surfaces, respectively through interference of light optically coupled to and from the cavity via the first and second interferometer devices.

39. The system of claim 38, further comprising a substrate holder configured to place the substrate in the cavity between the reference flats such that first and second surfaces of the substrate are substantially parallel with corresponding first and second reference surfaces of the first and second reference flats.

40. The system of claim 39, wherein the positioning mechanism is operable to move the damping plate perpendicular to the first or second surface of the substrate by a distance sufficient to allow the substrate holder to place the substrate between the first and second reference surfaces.

41. The system of claim 38, wherein the at least one damping plate comprises a first damping plate and a second damping plate, wherein the first damping plate overlaps a portion of the first surface of that substrate that does not overlap the first reference surface, the first damping plate having a first damping surface oriented parallel to the first reference surface, and wherein the second damping plate overlaps a portion of the second surface of the substrate that does not overlap the second reference surface, the second damping plate having a second damping surface oriented parallel to the second reference surface.

42. The system of claim 41, wherein the positioning mechanism includes a first actuator coupled to the first damping plate and a second actuator coupled to the second damping plate, wherein the first actuator is operable to position the first damping plate such that the first damping surface is two millimeters or less from the first surface of the substrate, wherein the second actuator is operable to position the second damping plate such that the second damping surface is two millimeters or less from the second surface of the substrate.

43. The system of claim 38 wherein the at least one damping plate and the first and second reference flats are oriented such that a center of the reference flats is off-center with respect to a center of the at least one damping plate and a center of the substrate when the substrate is placed in the optical cavity.

44. The system of claim 43 wherein an edge of the substrate is located proximate an edge of the first and second reference flats when the substrate is placed in the optical cavity.

45. The system of claim 43 wherein the first and second reference flats have a diameter that is sufficiently large that the first and second reference flats overlap a portion of the substrate that includes an edge and a center of the substrate when the substrate is placed in the optical cavity.

46. The system of claim 38, further comprising a substrate holder configured to move the substrate in a plane parallel to a plane of the at least one damping plate while the substrate is placed in the optical cavity.

47. The system of claim 46 wherein the substrate holder is configured to translate the substrate in one or more directions parallel to the plane of the at least one damping plate.

48. The system of claim 46 wherein the substrate holder is configured to rotate the substrate about an axis perpendicular to the plane parallel to a plane of the at least one damping plate.

49. A method for measuring shape or thickness information of a substrate, comprising:
a) placing a first portion of a substrate in an optical cavity formed between first and second reference flats in first and second interferometer channels to map first and second test surfaces of the substrate such that first and second surfaces of the substrate are substantially parallel with corresponding first and second reference surfaces of the first and second reference flats, wherein the first and second reference flats are of a size smaller than the substrate, whereby a portion of the first or second surface of the substrate does not overlap the first or second reference surface;
b) positioning at least one damping plate proximate the portion of the first or second surface of the substrate that does not overlap the first or second reference surface, the at least one damping plate having a damping surface oriented parallel to the first or second reference surface, wherein the damping plate is positioned such that the damping surface is three millimeters or less from the first or second surface of the substrate;
c) measuring cavity characteristics of the reference surfaces forming the cavity using the first or second interferometer channels;
d) providing a first phase shift in the interferometer channels to produce a first interferometer map of first portions of the first and second test surfaces of the substrate;
e) providing a second phase shift for measuring the cavity characteristics of the reference surfaces;
f) moving the substrate to place a second portion of the substrate in the optical cavity;
g) repeating d) and e) to produce a second interferometer map of second portions of the first and second test surfaces of the substrate;
h) stitching the first and second interferometer maps together; and
i) determining the shape or thickness information of the substrate from the first and second interferometer maps and the cavity characteristics.

50. The method of claim 49, wherein the at least one damping plate comprises a first damping plate and a second damping plate, wherein the first damping plate overlaps a portion of the first surface of the substrate that does not overlap the first reference surface, the first damping plate having a first damping surface oriented parallel to the first reference surface, and wherein the second damping plate overlaps a portion of the second surface of the substrate that does not overlap the second reference surface, the second damping plate having a second damping surface oriented parallel to the second reference surface.

51. The method of claim 50, wherein positioning the at least one damping plate includes positioning the first damping plate such that the first damping surface is three millimeters or less from the first surface of the substrate.

52. The method of claim 51 wherein positioning the at least one damping plate further includes positioning the second damping plate such that the second damping surface is three millimeters or less from the second surface of the substrate.

53. The method of claim 51 wherein a center of the reference flats is off-center with respect to a center of the at least one damping plate and a center of the substrate when the substrate is placed in the optical cavity.

54. The method of claim 51 wherein an edge of the substrate is located proximate an edge of the first and second reference flats when the substrate is placed in the optical cavity.

55. The method of claim 49 wherein the first and second reference flats have a diameter that is sufficiently large that the first and second reference flats overlap a portion of the substrate that includes an edge and a center of the substrate when the substrate is placed in the optical cavity.

56. The method of claim 49 wherein f) includes rotating the substrate about an axis that is perpendicular to the reference surfaces and off-center with respect to a symmetry axis of the reference flats, or translating the substrate along a direction parallel to the reference surfaces.

57. The method of claim 49 wherein the first and second interferometer maps overlap.

58. The method of claim 49 wherein the substrate is a semiconductor wafer.

* * * * *